United States Patent [19]
Yoshida et al.

[11] Patent Number: 5,274,684
[45] Date of Patent: Dec. 28, 1993

[54] APPARATUS FOR ASSEMBLING A NUCLEAR FUEL ASSEMBLY

[75] Inventors: Masashi Yoshida; Akio Sando; Junichi Oyama; Katsunori Ohuchi, all of Ibaraki, Japan

[73] Assignee: Mitsubishi Nuclear Fuel Co., Tokyo, Japan

[21] Appl. No.: 966,008

[22] Filed: Oct. 23, 1992

[30] Foreign Application Priority Data

Oct. 24, 1991 [JP] Japan .................. 3-278094

[51] Int. Cl.⁵ ............................................ G21C 3/334
[52] U.S. Cl. ............................................ 376/261
[58] Field of Search ............... 376/261, 260; 29/723, 29/906

[56] References Cited

U.S. PATENT DOCUMENTS

| | | | |
|---|---|---|---|
| 3,748,713 | 7/1973 | Tindale et al. | 376/261 |
| 4,653,180 | 3/1987 | Pargneux et al. | 29/723 |
| 4,729,867 | 3/1988 | DeMario | 376/261 |
| 4,760,637 | 8/1988 | Kerrey et al. | 376/261 |
| 4,894,848 | 1/1990 | Lambert et al. | 376/261 |
| 5,068,081 | 11/1991 | Oyama et al. | 376/261 |

FOREIGN PATENT DOCUMENTS

| | | |
|---|---|---|
| 0138711 | 4/1985 | European Pat. Off. |
| 0140283 | 5/1985 | European Pat. Off. |
| 1264369 | 2/1972 | United Kingdom . |
| 1397969 | 6/1975 | United Kingdom . |
| 1475244 | 6/1977 | United Kingdom . |
| 2225151 | 5/1990 | United Kingdom . |

OTHER PUBLICATIONS

Database WPIL, Derwent Publications Ltd., AN 88-327060 & JP-A-63 241 496, Oct. 6, 1988.

*Primary Examiner*—Daniel D. Wasil
*Attorney, Agent, or Firm*—Oblon, Spivak, McClelland, Maier & Neustadt

[57] ABSTRACT

The present invention presents a method and an apparatus for assembling a fuel assembly which is free of surface damage on the fuel rod surfaces, and of distortions caused by residual stresses. Such problems are introduced by the method of inserting the fuel rods into the grids, and the sequence of attaching the control rod guiding pipes. In the conventional method, the guiding pipes are attached to the respective grids first and the fuel rods are inserted in the grids while the holding mechanisms (such as spring force against a dimple formed on the grid wall) are active. In the invented assembling method, the sprigs are deactivated first and then the fuel rods are inserted into the grids. Once the assembly is made firm with all the fuel rods in place and fixed firmly to the grids, the control rod guiding pipes are inserted into the grids and the pipes are fixed rigidly to the respective grids. By performing the assembling operation in the above sequence, slight shifting of the grids which occurs on fixing the pipes to the grids, during the conventional method, is prevented. The final assembly produced according to the invented method is free of surface damage and the overall quality of alignment of the assembly is excellent.

11 Claims, 8 Drawing Sheets

APPARATUS FOR ASSEMBLING A NUCLEAR FUEL ASSEMBLY

BACKGROUND OF THE INVENTION

1. Field of the Invention

The present invention relates to a method for assembling a nuclear fuel assembly, and an apparatus for performing such a task.

2. Background Art

Fuel assemblies such as the one disclosed in U.S. Pat. NO. 5,068,081 shown in FIG. 7 have been known.

Figure 7:
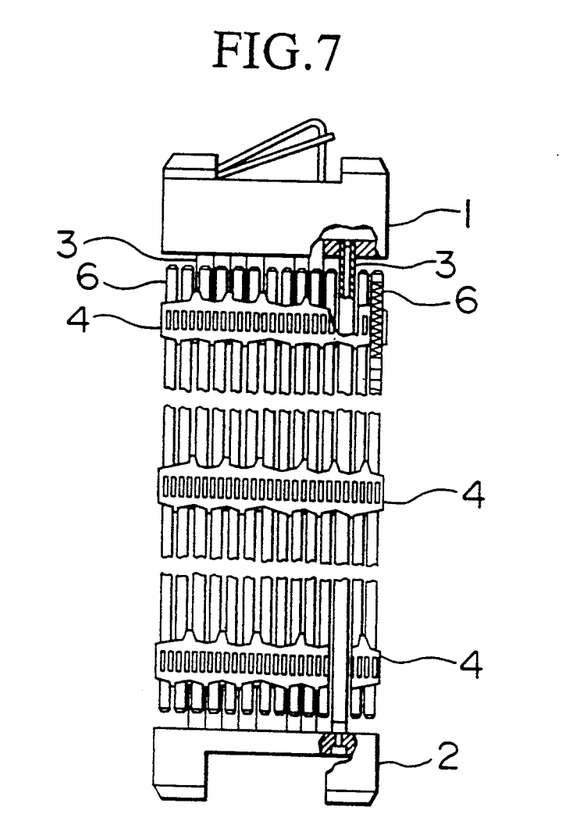
FIG. 7 is a side view of the conventional nuclear fuel assembling apparatus.

In this figure, the numerals 1 and 2 refer to a top and a bottom nozzles, respectively, which are disposed vertically and oppositely spaced apart, and between the top nozzle 1 and the bottom nozzle 2 are a plurality of rigidly fixed control-rod guide pipes 3 (hereinbelow referred to as guide pipes 3), and in the midway section of the control-rod guide pipes 3 are a plurality of grids 4 disposed vertically and spaced apart from each other.

Figure 8:
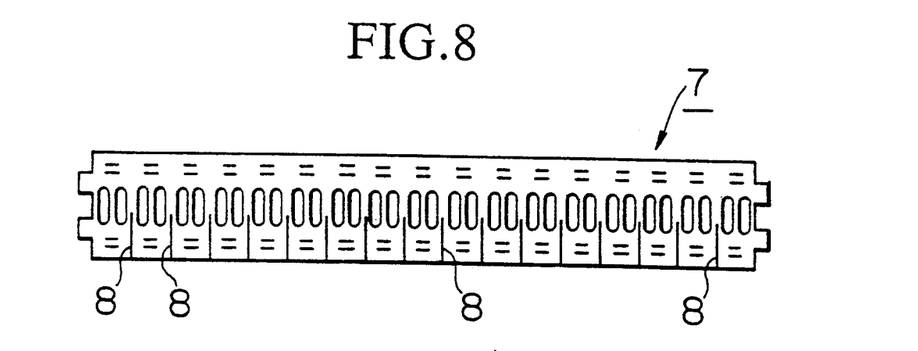
FIG. 8 is a front view of the straps used for forming the grid cells.
Figure 9:
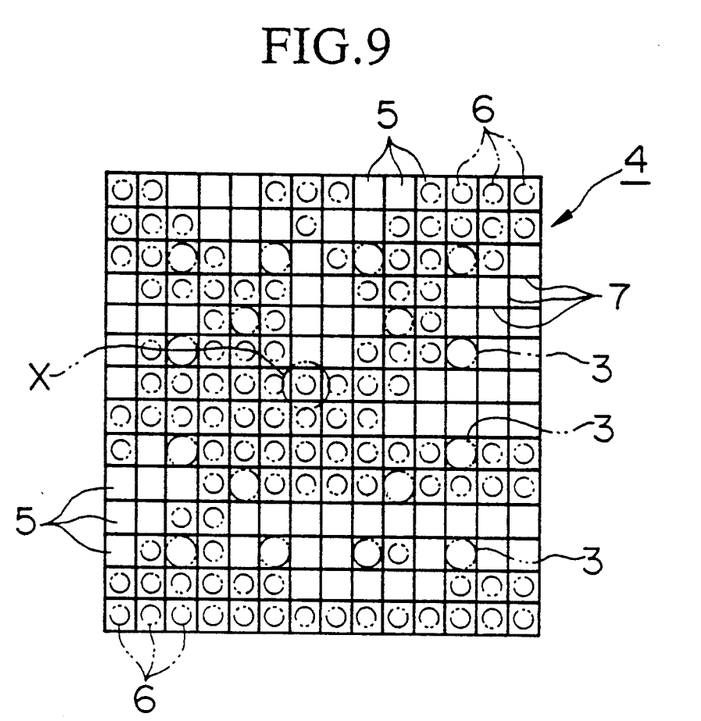
FIG. 9 is a view showing the inserted fuel rods in the grid cells.
Figure 10:
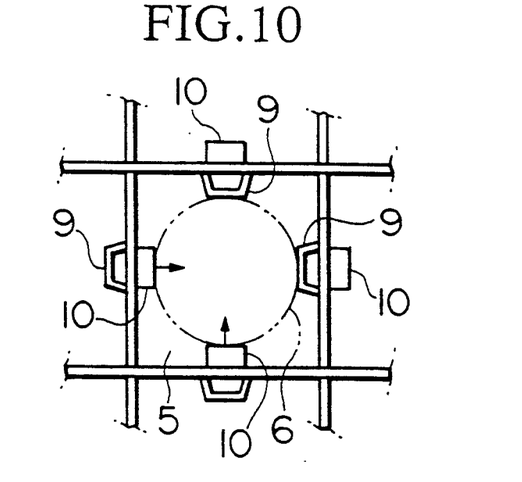
FIG. 10 is an enlarged view of a grid cell shown in FIG. 9.

The grids 4 are, as shown in FIGS. 8, 9 and 10, constructed of a plurality of straps 7 made of thin metal strips which have slits 8 provided at regular intervals in the longitudinal direction. By inserting the straps 7 into the slits 8 in each other's slits, a plurality of grid cell spaces 5 (hereinbelow referred to as grid cells 5) are formed. The fuel rod 6 is held firmly in the grid 5, by means of a pair of holding means consisting of a dimple 9 and a spring 10 disposed on opposing walls. The fuel rod 6 inserted into a grid cell 5 is pressed against the dimples 9 by the springs 10 as illustrated in FIG. 10, thereby supporting the fuel rod 6 firmly by the springs 10.

Figure 11:
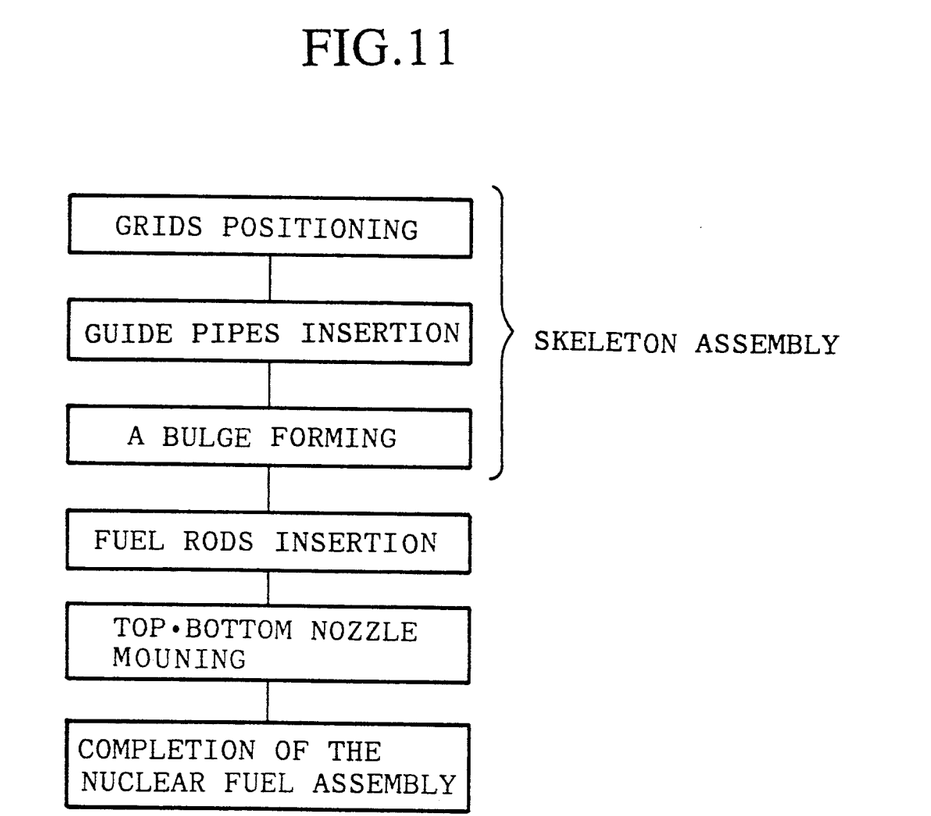
FIG. 11 is a block diagram showing the steps involved in a conventional method of assembling the fuel assembly.

The conventional method of assembling such a fuel assembly will be described with reference to FIG. 11.

First, the grids 4 are placed apart with a certain distance (positioning of grids). The guide pipes 3 are inserted into the predetermined and corresponding grid cells 5 of each of the grids 4, and are then rigidly attached to the grids 4 by bulge forming. Subsequently, the fuel rods 6 are inserted into the predetermined and corresponding grid cells 5 of each of the grids 4, by sliding the rods 6 against the springs 10 and dimples 9. The rods 6 are thereby secured in the grid cells 5 via the pressing force exerted by the springs 10 and dimples 9. When all of the rods 6 are inserted into the grid cells 5, the top and bottom nozzles 1 and 2 are firmly mounted to the opposite ends of the respective guide pipes 3.

In the conventional assembling method described above, the rods 6 are inserted, by sliding over the holding device (composed of dimples 9 and springs 10), into the spaces of the grid cells 5 after the guide pipes 3 have been rigidly attached to the grids 4. Because of the procedure, the guide pipes 3 are placed under slight non-uniform compressive stresses transmitted from the fuel rods 6 through to the grids 4. Further detailed explanations are provided in the preferred embodiments of the invention, but it suffices to mention that one of the contributions of the present invention is that the completed assembly shows very little distortion, as a result of the invented process of assembling the fuel assembly.

SUMMARY OF THE PRESENT INVENTION

The present invention was made in consideration of such problems associated with the conventional assembling method of the fuel assembly, and a purpose is to present a method of assembling the fuel assembly so as to prevent the generation of the distortion of the assembly as described above., and to present an apparatus for performing such a task.

According to a method of assembling a fuel assembly presented in the present invention, the springs formed on the wall of the grid cell and protruding out into the cell space are deactivated by means of key means for deactivating the holding means and then a fuel rod is inserted into the grid. Then the key means is removed from the grid cell to activate the springs so as to provide a firm holding of the fuel rod in the grid. The next step is to insert control rod guide pipes into the designated grid cells, and rigidly fixing the control rod guide pipe to the grid. By following the procedure described, it becomes possible to avoid introducing non-uniform stresses on the guide pipes, thereby preventing the distortion of the entire fuel assembly.

Figure 4:
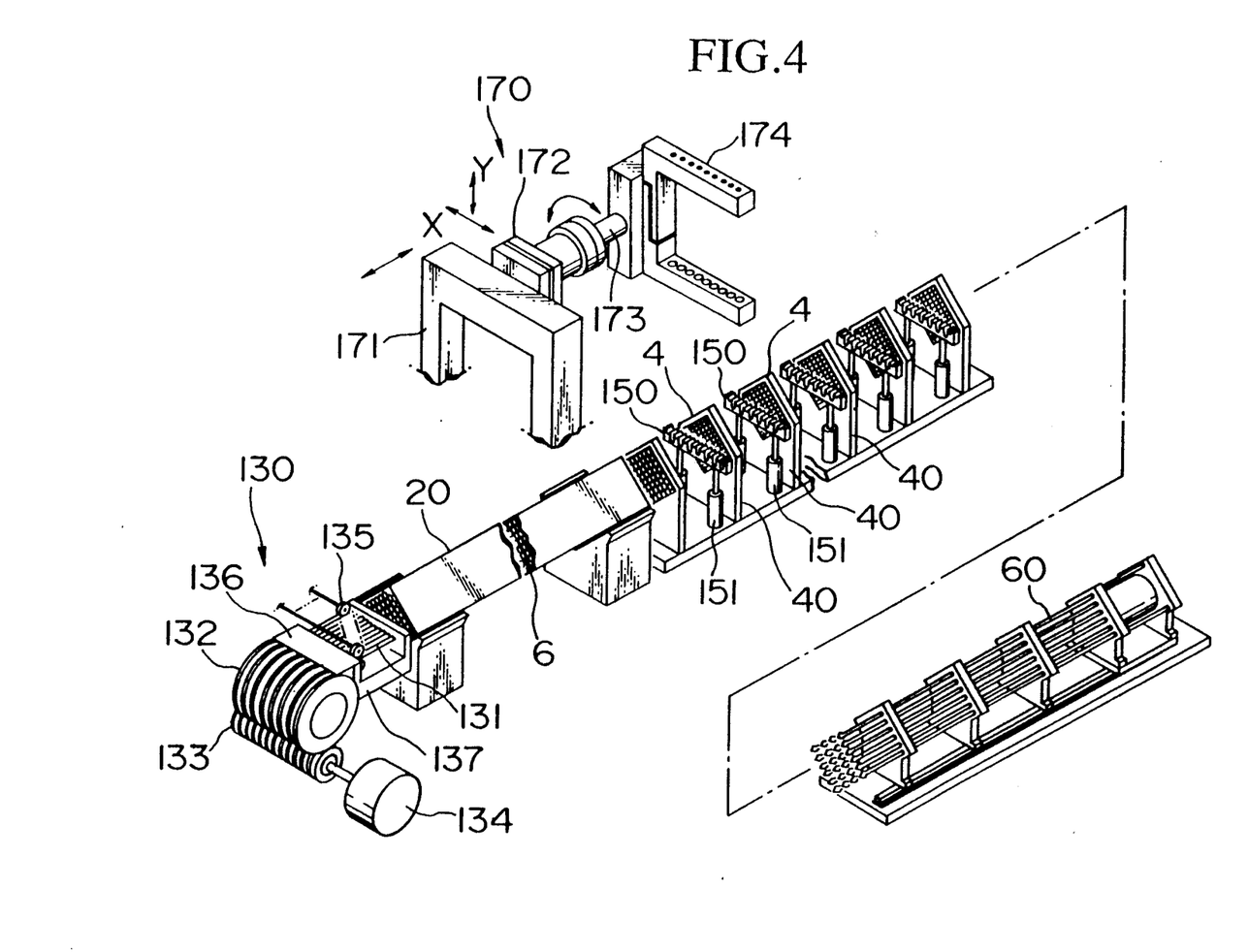
FIG. 4 is a schematic drawing showing the assembling method according to a second embodiment.

In the following, the explanations on the apparatus for assembling a fuel assembling are based on the fuel rods, shown in FIGS. 1 and 4, travelling from left to right in the illustration. The entry-side (left) is defined as the side from which the fuel rods enter some object, and the exit-side (right) is defined as the side from which the fuel rods exit.

The apparatus for assembling the fuel assembly in the present invention comprises:

(a) a fuel rod magazine which holds a plurality of parallel fuel rods in a horizontal position before insertion into the grids;

(b) a driving means disposed on the entry-side of the fuel rod magazine for driving the fuel rods from the fuel rod magazine and inserting the fuel rods into the grids;

(c) a plurality of regularly spaced support frames disposed outward of the exit-side of the fuel rod magazine, said frames supporting grids so that the opening of the grid faces the fuel rod magazine;

(d) regularly spaced guiding means disposed on the entry-side of each of the plurality of regularly spaced support frames providing support to the underside of the fuel rods exiting the fuel rod magazine to prevent sagging of the fuel rods;

(e) an expander jig for bulging the control rod guide pipes.

According to the assembling apparatus presented above, after the springs which are protruding into the spaces of the grid cell are deactivated manually or automatically with the use of key means, the fuel rods are inserted into the grids, then the springs are reactivated to hold the fuel rods firmly therein. The control rod guide pipes are then inserted into the designated grid cells and are rigidly fixed to the grids. The top and the bottom nozzles are installed to complete the steps of manufacturing a fuel assembly. According to the assembling apparatus presented, guiding means are effective in preventing damages being introduced to the fuel rods, by preventing sagging of the fuel rods while entering the grid cells and causing possible damage to the rod surface or to the grids 4.

PREFERRED EMBODIMENT OF THE INVENTION

A first embodiment of the invention will be explained with reference to FIG. 1. In the following, the structures which are common to the conventional assembly are given the same designations, and their detailed explanations are omitted.

In the following, the explanations on the apparatus for assembling a fuel assembly are based on the fuel rods, shown in FIG. 1, travelling from left to right in the illustration. The entry-side (left) is defined as the side from which the fuel rods enter some object, and the exit-side (right) is defined as the side from which the fuel rods exit the object.

Figure 1:
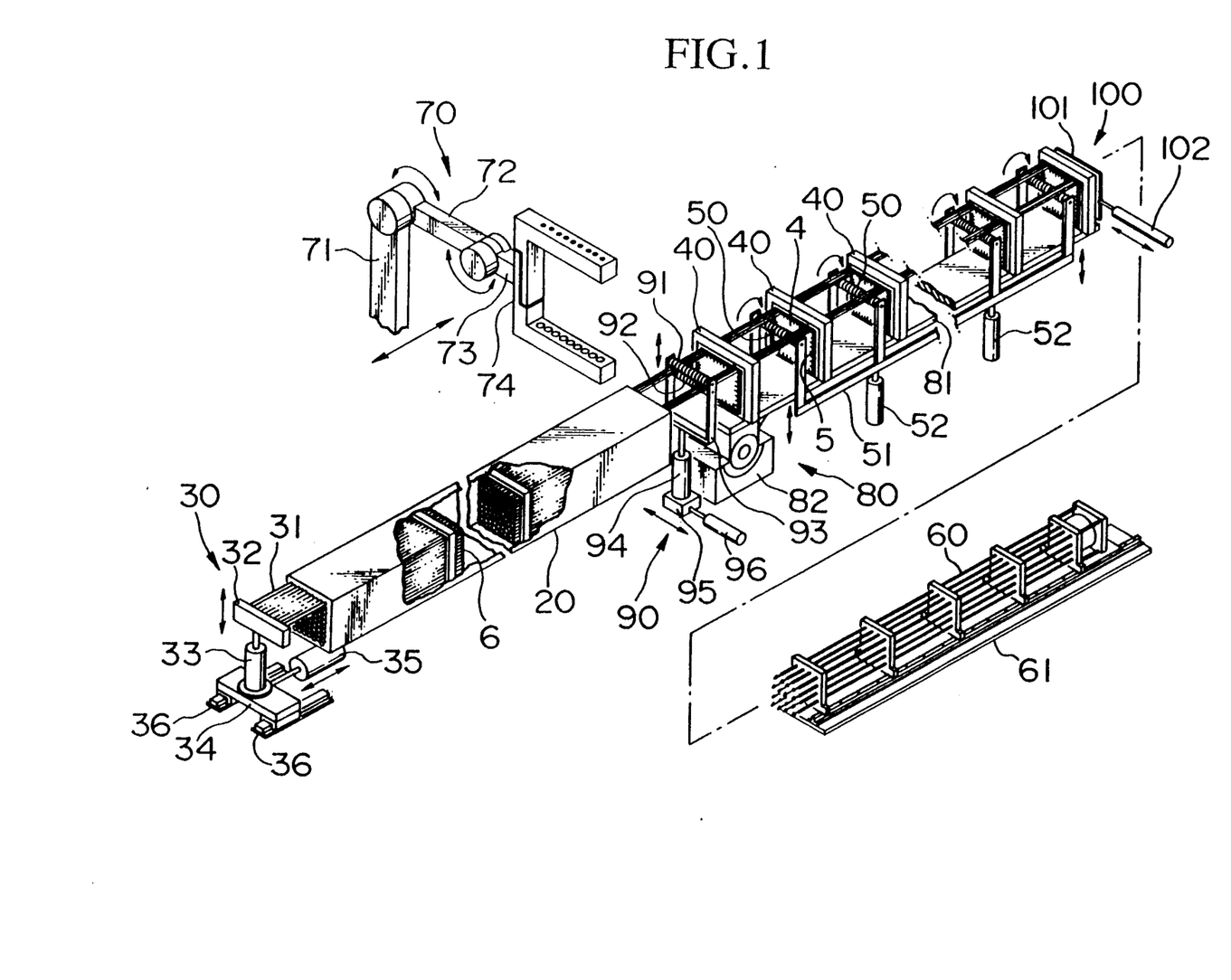
FIG. 1 is a schematic drawing of the apparatus for assembling the fuel assembly in a first preferred embodiment of the invention.

The assembling apparatus shown in FIG. 1 comprises: a rectangular parallelepiped shaped fuel rod magazine 20 (shown on the left side of the illustration) which supports a plurality of horizontally placed fuel rods 6; a push-out mechanism 30 (driving means) which pushes the fuel rods 6 to the exit-side of the assembling apparatus; a plurality of support frames 40 which are arranged outward of the exit-side of the fuel rod magazine 20, in such a way that open sections of the grid cells 5 face toward the fuel rod magazine 20; a plurality of fuel rods support rollers (guiding means) 50 which are disposed at the entry-side of the support frames 40 (i.e. between the support frames 40 and the fuel rod magazine 20), providing support from underside to the fuel rods 6 exiting from the fuel rod magazine 20 in the direction of grid cells 5 to prevent the rods 6 from sagging; an expander jig 60 which is inserted inside the space of the guide pipe 3 which is inserted into the grid cells 5, and expand the guide pipe 3; and key mean manipulator 70 disposed on one side of the support frames 40.

Figure 2:
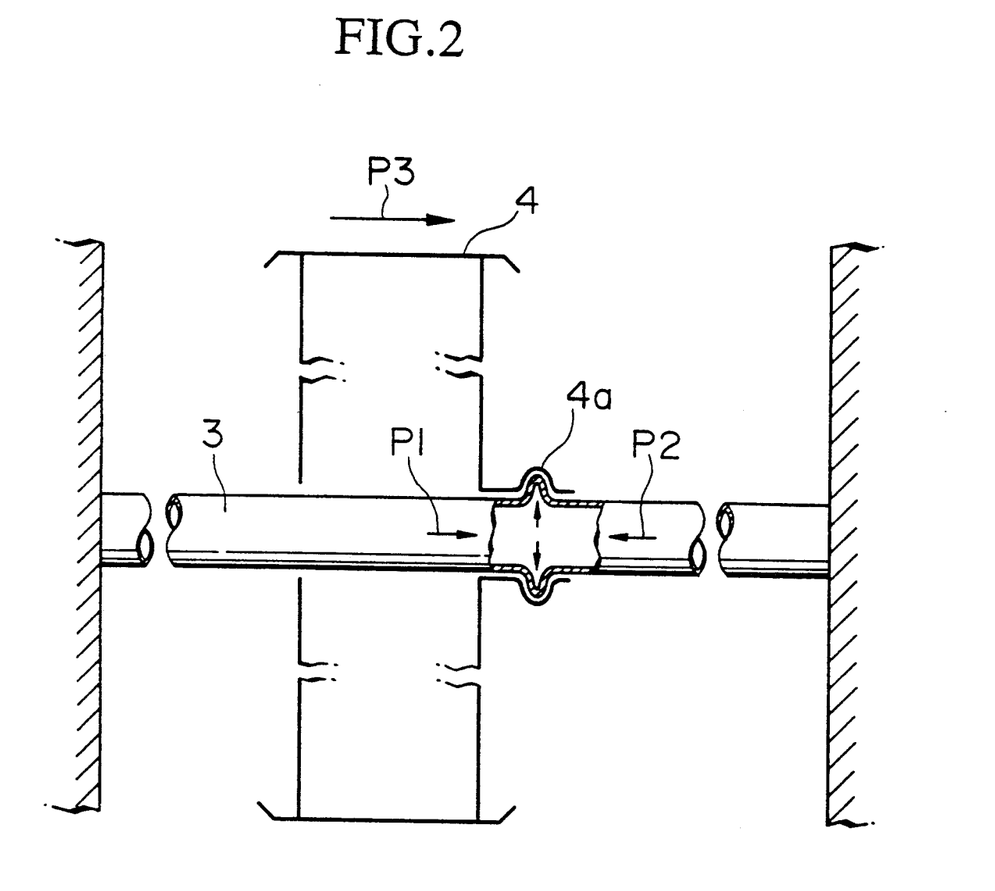
FIG. 2 is a schematic illustration showing the joint between a grid and a control rod guide pipe.

The grids 4 of the first embodiment are provided with a plurality of sleeves 4a extending out in one direction, as shown schematically in FIG. 2, at those grid cells 5 where the guide pipes 3 are to be inserted. (This figure shows only one such sleeve for the purpose of illustration.)

The push-out mechanism 30 comprises: a push plate 32 having a plurality of push rods 31 extending toward the fuel rod magazine 20; a threaded screw support 33 which supports the push plate 32 and provide means for the vertical adjustments thereof; a base 34 which supports the threaded screw support 33; a cylinder 35 to provide longitudinal movement of the base 34; and a pair of rails 36 providing a freely sliding movement to the base 34.

The support frames 40 are disposed on the upper portion of a raising mechanism 80 which performs the function of raising the fuel assembly when the assembling operation is completed.

The raising mechanism 80 comprises: a rotating base 81 in a form of an extending plate which is disposed at one end of the fuel rod magazine 20 and along the longitudinal direction of the fuel rod magazine 20; rotating means 82 which provides a driving power so as to raise the rotating base 81 from the horizontal position to an inclined position.

The fuel rods support roller 50 is supported on a frame 51 provided on the side region of the rotating base 81, and is freely rotatable around an axis perpendicular to the axis of the fuel rods 6. The frame 51 is supported by means of a plurality of threaded screw supports 52 which are freely movable vertically.

The expander jig 60 is provided, at the tip end (the extreme left portion of the jig 60 in FIG. 1), with a known expander device for the guide pipe 3 freely movable longitudinally on the base support 61, and is power driven into the guide pipe 3 provided on the grid 4 supported on the support frames 40.

The key means manipulator 70 comprises: a leg section 71 which is disposed vertically on the side region of the raising mechanism 80, and which is movable freely in the longitudinal direction of the raising mechanism 80; an arm section 72 which is attached rotatably to the leg section 71 and an arm section 73 which is attached rotatably to the arm section 72; a sideways U-shaped guide section 74 attached to the end of the arm 73; and key means operating device (not shown) accompanying the guide section 74. The function of the key means operating device is to deactivate the spring 10 by inserting key means (not shown) into the grid 4, and to reactivate the spring 10 by removing the key means therefrom.

At the exit-side of the fuel rod magazine 20 are disposed fuel rod insertion rollers 90 disposed transversely to the axis of the fuel rods 6. The insertion rollers 90 comprise: two main rollers 91·92 which are horizontally disposed one above and one below the fuel rods, and which are rotated by a power means; a frame 93 which freely rotatably supports the rollers 91·92; a threaded screw support 94 which supports the frame 93 freely movable vertically; and a cylinder 96 which moves the threaded screw support 94 transversely (perpendicular to the fuel rods 6) via the roller plate 95.

At the exit-side of the support frames 40 situated farthest from the fuel rod magazine 20 (the right end in FIG. 1) is disposed a stopper plate 100. The stopper plate 100 comprises: a rectangular shaped positioning plate 101 (positioning means) and a cylinder 102 which is disposed on the side region of the positioning plate 101, and which moves the positioning plate 101 transversely. There is no particular restriction to the positioning plate 101, so long as it can move approximately transversely to the fuel rods, both vertically and horizontally.

Figure 3:
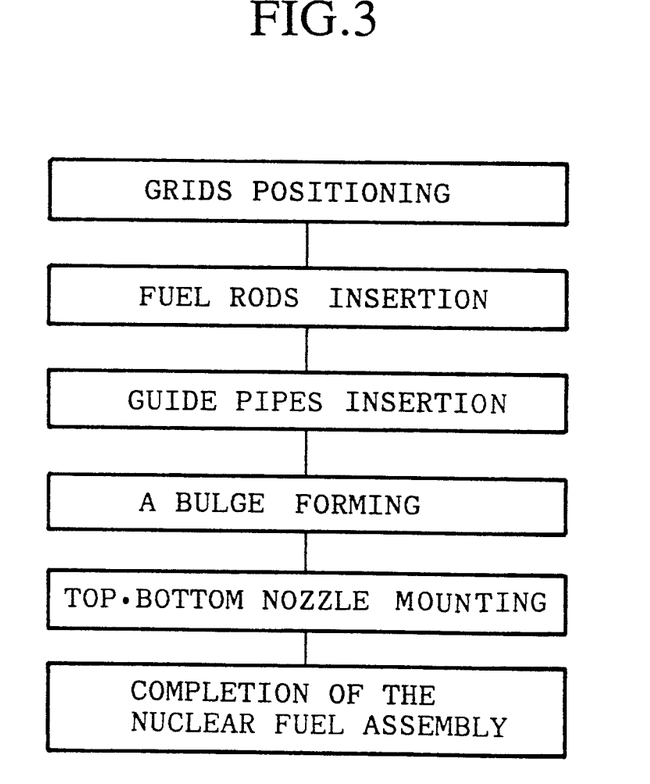
FIG. 3 is a block diagram showing the steps for an assembling method according to the first embodiment.

Next, the method of assembling the fuel assembly using the assembling apparatus of the first embodiment will be described with reference to a block flow diagram shown in FIG. 3.

First, a grid 4 is set to each of the supporting frames 40 (grid positioning). Next, by means of the key means manipulator 70, key means are inserted into each grid 4, thereby placing the spring 10 on the grid 4 in the deactivating position. The key means insertion operation can also be carried out manually. Next, the push-out mechanism 30 is adjusted so as to place the push rods 31 to correspond with the fuel rods 6 stored at the topmost position of the fuel rod magazine 20, and, by retracting the cylinder 35, the topmost fuel rods 6 are pushed toward the grid 4. The exiting fuel rods 6 pass between the main rollers 91·92, which then drive the fuel rods 6 into the inside of the grid cells 5 of the first grids 4. The fuel rods 6 continue their travel through the first grids 4 and continue on into the grid cells 5 of the next set of grids 4, while the bottom surface of the fuel rods is being supported by the fuel rod support rollers 50.

According to the assembling apparatus of the first embodiment, by disposing the fuel rod support roller 50 on the entry-side of the grids 4, the tip of the exiting fuel rods 6 are prevented from sagging due to their own weight. Otherwise, the sagging of the tip of the fuel rods 6 may cause scratches (fine surface damage) to the surface of the fuel rods or damages to the grids 4 due to mechanical interference of the straps 7, which form the grids 4, with the fuel rods. An advantage of the present apparatus is that by providing support to the moving fuel rods 6, the generation of surface damage such as fine scratches is avoided, thereby maintaining the high quality of the fuel assembly.

As the fuel rods are pushed into the grid cells 5 of the last set of grids 4, the exiting ends of the fuel rods 6 ultimately butt up against the positioning plate 101 of the stopper plate 100. At this stage, the insertion operation of the topmost fuel rods 6 in the fuel rod magazine 20 has been completed.

Next, the cylinder 35 of the push-out mechanism 30 is extended to return the push plate 32 to the starting position. The threaded screw support 33 of the push-out mechanism 30 is lowered slightly so that the push rods 31 correspond with the fuel rods 6 in the second tier of the fuel rod magazine 20. The positions of the main rollers 91·92 and of the fuel rod support roller 50 are also adjusted slightly lower to correspond with the fuel rods 6 in the second tier of the fuel rod magazine 20. Then, the fuel rods 6 in the second tier are pushed into each of the grids 4 as before.

The same procedure is followed for other fuel rods 6 in other tiers until all the fuel rods 6 are placed in the respective grids 4 of the fuel rod magazine 20.

The key mean manipulator 70 is again operated to take out the key means from the grids 4. This operation place the springs 10 in contact with the surface of the fuel rods 6 (activated) in the grids 4, thereby firmly holding the fuel rods 6 within the grids 4.

The fuel rod magazine 20 is removed, and the required number of guide pipes 3 are inserted in the sleeves 4a provided on each grids 4, using the installation process similar to that described for the fuel rods 6.

Next, the expander jig 60 is advanced into the inside of the guide pipes 3, and the bulging tool at the tip of the expander jig 60 is placed to correspond with the position of the sleeve 4a of the grids 4 situated farthest from the expander jig 60 (the left of FIG. 1). The guide pipes 3 and the sleeves 4a are bulge formed as shown in FIG. 2 with the use of the expander jig 60, thereby fixing the relative position of the grid 4 and the guide pipes 3 within the fuel assembly.

In the above procedure, at the time of installing the guide pipes 3, because the grids 4 are not able to move due to the fuel rods 6 firmly attached thereto, the stretching caused by the expander jig 60 imposes a slight uniform tension on the guide pipes 3 in the direction shown by the arrows P1 and P2 in FIG. 2. This slight tensile force in the guide pipes may be responsible for preventing the distortion of the fuel assembly. It is thought that if the grids 4 were able to shift their positions relative to the fuel rods 6, the grids 4 would move in the direction of the arrow P3 upon the bulging operation, thereby relieving the tensile stress created by the bulging operation. In the process of the present invention, the grids 4 are firmly held in place by the fuel rods 6, achieved in the previous step of clamping with the springs 10, making the grids 4 unable to move, thereby creating a uniform residual tension in the fuel assembly.

Further, when inserting the fuel rods into the grids according to the conventional assembling method, unless the alignment of all the fuel rods are maintained precisely with respect to each other until the assembling operation has been completed, non-uniform compressive stresses are often introduced into the guide pipes, thereby causing distortion of the fuel assembly. However, according to the method of the present invention, the fuel rods and the grids are firmly held together before the guide pipes are fixed in place, thus preventing the introduction of non-uniform compressive stresses into the guide pipes.

A second embodiment of the assembling apparatus will be explained with reference to FIG. 4. The features common to the first embodiment will be given the same reference numeral, and the detailed explanations are omitted.

The difference between the first and the second embodiments is that, in the second embodiment, the fuel rod magazine 20 is rotated through an angle of 45 degrees around the longitudinal axis thereof, and the grids 4 and the expander jig 60 are, correspondingly, rotated through the same angle.

Figure 5:
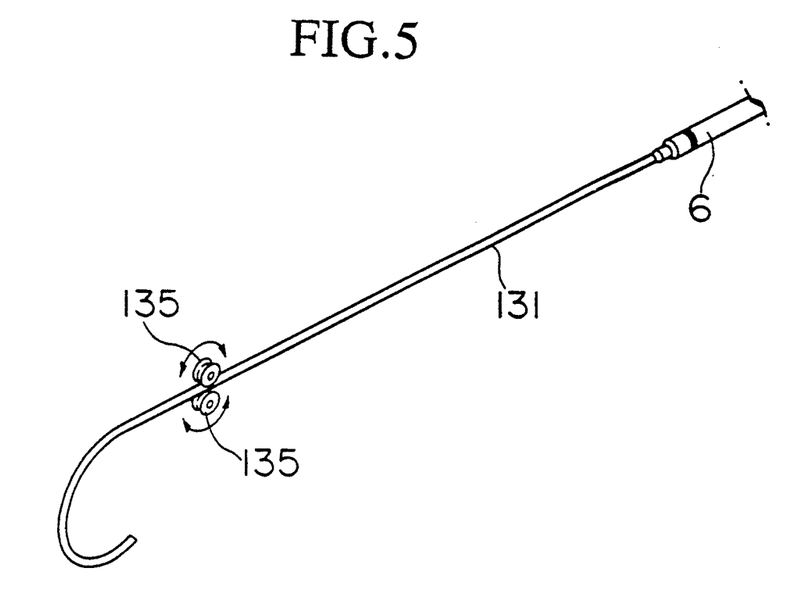
FIG. 5 is an oblique view of a tube used for the assembling apparatus according to the second embodiment.

Further difference is that the push-out mechanism 30 using the rods 31 in the first embodiment are replaced in the second embodiment with a tube driving mechanism 130 which comprises: longitudinal flexible nylon tubes 131 extensible in the direction of the fuel rods 6; a pick-up roller 133 which winds the tubes 131 on a drum 132; a motor 134 which rotates the pick-up roller 133; the driving rollers 135, disposed between the drum 132 and the fuel rod magazine 20, and arranged so that one roller is above and the other below the tube 131 so as to pinch the tubes 131 therebetween to drive the tubes 131 into the fuel rod magazine 20; a roller cover 136 which is disposed between the driving rollers 135 and the drum 132; and a support base 137 of the push-out mechanism 130 vertically movable as a whole.

Further difference is that, in the first embodiment, the fuel rods 6 were supported by support rollers 50 before they entered the grids 4, but in the second embodiment, this has been replaced with guide plates 150 (guiding means) having a number of notches sufficient to accept two tiers of fuel rods 6. The height of the guide plate 150 is adjusted by means of the threaded screw supports 151.

Further difference is that, in the first embodiment, the key means manipulator 70 was disposed on the side region of the raising mechanism 80, but in the second embodiment, the key means manipulator mechanism 170 was disposed above the fuel rod magazine 20. The key means manipulator mechanism 170 is disposed so that it saddles the fuel rod magazine 20, and comprises:

a leg 171 of an inverted U-shape which is movable in the longitudinal direction of the fuel rod magazine 20; a table 172 which is disposed on the upper exit-side of the leg 171, and which is movable in the X-Y direction (illustrated in FIG. 4); a shaft 173 disposed on the exit-side of the table 172 (right in FIG. 4) and extending in the longitudinal direction and having a joint rotatable around the shaft axis; a guide part 174 which is disposed at the end of the shaft 173, and which deactivates the spring 10 when key means is inserted into the grids 4 and activates the spring 10 when the key means is removed from the grids 4; and key means operating device (not shown) for insertion and removal of the key means.

The assembling method using the apparatus of the second embodiment will be explained below.

As in the first embodiment, the grids 4 are placed on each of the support frames 40, and by operating the key means manipulator mechanism 170, key means are inserted into the grids 4 to deactivate the springs provided on each grid 4.

Next, by adjusting the height of the support base 137 of the push-out mechanism 130, the position of the tube 131 is adjusted to correspond with the fuel rods 6 located at the topmost level (the apex of the grids 4 in FIG. 4), and only those tubes 131 corresponding to the fuel rods 6 are driven in the direction of the fuel rods magazine 20, thereby pushing the respective fuel rods 6 in the grid direction. The exiting fuel rods 6 are supported by means of the guide plate 150 from the underside, and are then inserted into the grids 4.

The extended tubes 131 are wound back onto the pick-up roller 133 to return the tubes 131 to the initial position. Next, the support base 137 is lowered to a position to correspond with the next tier of fuel rods 6, which are pushed out and inserted into the grids 4 as in the above process.

By repeating the above described process for all the fuel rods 6 in the fuel rod magazine 20, a fuel assembly is produced.

According to the assembling apparatus presented in the second embodiment, because both the fuel rod magazine 20 and the grids 4 are inclined at 45 degrees, it becomes possible to utilize the gravity of the key means weight in the step of inserting the key means into the grids 4 with the use of the key means manipulator mechanism 170, thereby providing an advantage that the key means insertion operation is simplified.

Other advantages are the same as in the first embodiment, and they are not prepared.

Figure 6:
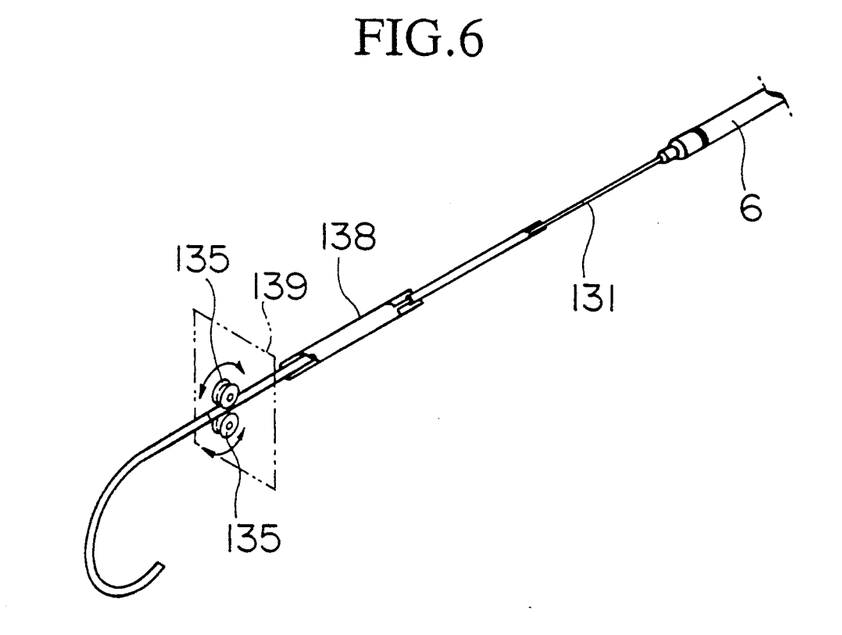
FIG. 6 is an oblique view of a tube used for a variation of the assembling apparatus according to the second embodiment.

In the second embodiment, the fuel rod magazine 20 and the grids 4 were rotated through 45 degrees about a longitudinal axis thereof, but any angle in a range of not less than 10 degrees and not more than 80 degrees is effective for a gravity assisted operation. The most preferred range is not less than 40 degrees and not more than 50 degrees of inclination.

a variation of the second embodiment will be explained with reference to FIG. 6. In the second embodiment the tubes 131 were made of nylon. In the variation version, the tips of the tubes 131 are protected by installing a freely extendable outer tube 138, made of titanium, which is shaped like an extending antenna, and installing a stopper 139 at the entry-side (left in FIG. 6) of the tube 131 to prevent drifting of the terminal end of the outer tube 138, and thereby to prevent the interference effects between the outer tube 138 and the driving rollers 135.

According to this variation of the second embodiment, the deformation of the tube 131 is prevented with the use of the outer tube 138, enabling the operation of driving the fuel rods 6 to be performed reliably.

The present invention is not bound by the embodiments presented above, and other variations are possible without deviating from the basic concepts of the invention.

What is claimed is:

1. An apparatus for assembling a fuel assembly consisting essentially of a plurality of fuel rods firmly held in grids, and control rod guide pipes rigidly held in grids, said apparatus comprising:
    (a) a fuel rod magazine which holds a plurality of parallel fuel rods in a horizontal position before insertion into said assembly;
    (b) a driving means disposed on the entry-side of said fuel rod magazine for driving said fuel rods forward from said fuel rod magazine and inserting said fuel rods into said grids;
    (c) a plurality of regularly spaced support frames disposed on the exit-side of said fuel rod magazine, said frames supporting grids so that the grid cells of said grids face said fuel rod magazine;
    (d) a plurality of regularly spaced guiding means disposed on the entry-side of said plurality of regularly spaced support frames, said guiding means providing support to the underside of said fuel rods exiting said fuel rod magazine to prevent sagging of said fuel rods;
    (e) an expander jig having bulging means for bulging said control rod guide pipes.

2. An apparatus for assembling fuel assembly as claimed in claim 1, wherein said support frames are disposed at regular intervals on the upper surface of a rotating base extending in the fuel rod direction, wherein said rotating base is provided, at the entry-side of said rotating base, with a rotating means for rotating and holding said rotating base from a horizontal position to an inclined position.

3. An apparatus for assembling a fuel assembly as claimed in claim 1, wherein said guiding means is a freely rotating roller disposed transversely to the direction of travel of said fuel rods, and rotating about the center axis of said freely rotating roller.

4. An apparatus for assembling a fuel assembly as claimed in claim 1, wherein said guiding means is supported by a threaded screw arrangement to adjust the vertical positioning of said guiding means.

5. An apparatus for assembling a fuel assembly as claimed in claim 1, wherein fuel rods exiting said fuel rod magazine are driven further forward into said grid by means of a pair of driving rollers provided at the exit-side of said fuel rod magazine.

6. An apparatus for assembling a fuel assembly as claimed in claim 5, wherein said driving rollers comprises: a plurality of main rollers driven by driving means; a roller support which freely rotatably support said main rollers; a threaded screw support which provides a freely movable vertical support to said roller support frame.

7. An apparatus for assembling a fuel assembly as claimed in claim 1, wherein the exit-side of a support frame situated farthest from said fuel rod magazine is provided with a stopper plate so as to align and stop the forward movement of said fuel rods.

8. An apparatus for assembling a fuel assembly as claimed in claim 7, wherein said stopper plate is provided with: positioning means for aligning said fuel rods by contacting the exit-side end surface of said fuel rods; and with moving means for moving said stopper plate transversely to the fuel rod direction.

9. An apparatus for assembling a fuel assembly as claimed in claim 1, wherein said driving means comprises: a plurality of slidable tubes; a pick-up drum for winding said tubes; and driving rollers which insert the tubes into said fuel rod magazine.

10. An apparatus for assembling a fuel assembly as claimed in claim 9, wherein each of said tubes is provided with a freely extendable outer tube which fits on the outside of said tube.

11. An apparatus for assembling a fuel assembly as claimed in claim 10, wherein said outer tube comprises an extendable antenna type tube.

* * * * *